United States Patent [19]

Ueno

[11] Patent Number: 4,960,624

[45] Date of Patent: Oct. 2, 1990

[54] FLUOROELASTOMER COMPOSITION AND HEAT SHRINKABLE ARTICLES COMPRISING SAME

[75] Inventor: Keiji Ueno, Osaka, Japan

[73] Assignee: Sumitomo Electric Industries, Ltd., Osaka, Japan

[21] Appl. No.: 188,724

[22] Filed: Apr. 29, 1988

Related U.S. Application Data

[63] Continuation of Ser. No. 862,922, May 14, 1986, abandoned.

[30] Foreign Application Priority Data

May 14, 1985 [JP] Japan ............................. 60-102266
May 14, 1985 [JP] Japan ............................. 60-102267

[51] Int. Cl.$^5$ ..................... F16L 11/06; C08F 14/22; C08F 14/26; C08F 14/28
[52] U.S. Cl. ................................ 428/35.1; 522/109; 522/156; 525/199; 264/22
[58] Field of Search ............. 525/199; 428/34.9, 35.1; 522/109

[56] References Cited

U.S. PATENT DOCUMENTS

| | | | |
|---|---|---|---|
| 3,859,259 | 1/1975 | Harrell | 525/383 |
| 4,035,565 | 7/1977 | Apotheker | 525/368 |
| 4,094,949 | 6/1978 | Yokokawa | 525/199 |
| 4,148,982 | 4/1979 | Morozumi | 525/386 |
| 4,214,060 | 7/1980 | Apotheker | 525/368 |
| 4,452,838 | 6/1984 | Ueno | 522/109 |
| 4,530,971 | 7/1985 | Geri | 525/199 |
| 4,555,543 | 11/1985 | Effenberger | 525/199 |

*Primary Examiner*—Marion C. McCamish
*Assistant Examiner*—Arthur H. Koeckert
*Attorney, Agent, or Firm*—Sughrue, Mion, Zinn, Macpeak & Seas

[57] ABSTRACT

A fluoroelastomer composition is disclosed, which comprises a mixture of 100 parts by weight of a tetrafluoroethyline-propylene copolymer, not smaller than 1 part by weight and smaller than 100 parts by weight of a vinylidene fluoride-fluoroolefin copolymer having a fluoroolefin content of 1 to 20 mol %, and a cross-linking agent, said mixture being cross-linked by irradiation with electron beams. The fluoroelastomer composition has a high mechanical strength and improved low temperature characteristics. When the content of the vinylidene fluoride-fluoroolefin copolymer is not smaller than 10 parts by weight and smaller than 100 parts by weight per 100 parts by weight of the tetrafluoroethylene-propylene copolymer the fluoroelastomer composition is suitable as a material for producing heat shrinkable tubes.

6 Claims, No Drawings

FLUOROELASTOMER COMPOSITION AND HEAT SHRINKABLE ARTICLES COMPRISING SAME

This is a continuation of application Ser. No. 862,922, filed May 14, 1986, now abandoned.

BACKGROUND OF THE INVENTION

The present invention relates to a fluoroelastomer composition suitable for the production of electrical insulating materials. More particularly, it relates to a fluoroelastomer composition comprising a blend of two or more fluororesins. Also, the present invention is concerned with a heat shrinkable articles such as heat shrinkable tubes comprising a fluoroelastomer composition.

Generally, fluoroelastomers are highly resistant to heat, oil and chemicals and therefore they are used for various purposes such as for the production of gaskets, packings and hoses. In view of the characteristics of fluoroelastomers there has been increasing desire to use them as an electrical insulating material such as a covering material for electrical wires and heat shrinkable tubes for protecting terminals of communication cables and electric cables.

However, conventional fluoroelastomers have various defects that they are poor in electrical characteristics and mechanical strength, and therefore improvement has been desired.

Recently, tetrafluoroethylene-propylene based copolymers have been developed as a fluoroelastomer which has an excellent electrical characteristic. Such tetrafluoroethylene-propylene based copolymers include copolymers of (i) tetrafluoroethylene and (ii) propylene as major component monomers and (iii) one or more third component monomers copolymerizable therewith such as, for example, ethylene, isobutylene, acrylic acid, alkyl acrylates, vinyl fluoride, vinylidene fluoride, hexafluoropropene, chloroethyl vinyl ether, chlorotrifluoroethylene, and perfluoroalkyl vinyl ether in a suitable amount.

However, when the conventional tetrafluoroethylene-propylene copolymers are intended to be used as an electrical insulating material for electric wires, in particular as heat-shrinkable tubes they are unsatisfactory since they show a poor mechanical strength, and they are not strong enough after being extrusion-coated on wires to render the covered wires self-supporting and therefore they cannot be used as is.

Further, when the conventional tetrafluoroethylene-propylene copolymers are used for the production of heat-shrinkable tubes, the resulting tubes are poor in heat settability, that is, they are difficult to maintain their shape or form after expansion.

In order to improve the mechanical strength of fluororesins, it has heretofore been proposed to blend a fluoroelastomer with a fluororesin, in particular a crystalline polymer, such as ethylene-tetrafluoroethylene copolymers, tetrafluoroethylene-hexafluoropropylene copolymers, polyvinylidene fluoride, vinylidene fluoride-fluoroolefin copolymers and the like as described in, e.g., U.S. Pat. Nos. 4,094,949 and 4,575,537.

However, by blending these fluororesins the low temperature characteristics of the fluoroelastomer composition is deteriorated and articles comprising such blends does not pass low temperature test at −10° C. which ordinary insulated wires are required to pass although the mechanical strength of them is improved, and as a result they cannot be used practically.

SUMMARY OF THE INVENTION

Therefore, an object of the present invention is to provide a fluoroelastomer composition having an improved mechanical strength and an improved low temperature characteristics simultaneously.

Another object of the present invention is to provide a heat-shrinkable article comprising such fluoroelastomer composition.

As a result of extensive research the above objects have been attained by providing a fluoroelastomer composition comprising a mixture of 100 parts by weight of a tetrafluoroethylene-propylene copolymer, not smaller than 1 parts by weight and smaller than 100 parts by weight of a vinylidene fluoride-fluoroolefin copolymer having a fluoroolefin content of 1 to 20 mol%, and a cross-linking agent, said mixture being cross-linked by irradiation with electron beams, and by providing ,a heat shrinkable tube comprising a fluoroelastomer composition comprising a mixture of 100 parts by weight of a tetrafluoroethylene-propylene copolymer, not smaller than 10 parts by weight and smaller than 100 parts by weight of a vinylidene fluoride-fluoroolefin copolymer having a fluoroolefin content of 1 to 20 mol %, and a cross-linking agent, said mixture being cross-linked by irradiation with electron beams.

DETAILED DESCRIPTION OF THE INVENTION

Suitable examples of the fluoroolefins which can be used in the vinylidene fluoride-fluoroolefin copolymer include hexafluoropropylene and tetrafluoroethylene, which are preferred in view of ease of processability.

In the present invention, the vinylidene fluoride-fluoroolefin copolymer is used in an amount of not smaller than 1 part by weight and smaller than 100 parts by weight, preferably not smaller than 10 parts by weight and smaller than 100 parts by weight, per 100 parts by weight of the tetrafluoroethylene-propylene copolymer since when the content of the vinylidene fluoride-fluoroolefin copolymer is smaller than 1 part by weight substantially no improvement is observed in the mechanical strength of the resulting fluoroelastomer composition, while irradiation with electron beams gives rise to substantially no improvement in the low temperature characteristics or even deteriorates this characteristics when the content of the vinylidene fluoride-fluoroolefin copolymer is not smaller than 100 parts by weight. With a vinylidene fluoride-fluoroolefin content of smaller than 10 parts by weight, the heat setting properties of the resulting fluoroelastomer composition are unsatisfactory for producing heat shrinkable tubes.

The fluoroolefin content of the vinylidene fluoride-fluoroolefin copolymer is fixed to 1 to 20 mol% so as to endow the copolymer with property of crystalline polymer in order to obtain a mechanical strength of a predetermined desired level.

The fluoroelastomer composition of the present invention can contain various additives conventionally used in covering materials for electric wires. For example, it can contain an inorganic filler such as carbon black, finely divided silica, titanium dioxide, clay, diatomaceous earth, talc, mica powder, calcium carbonate and the like.

In order to use a product, such as a sheet prepared from the fluoroelastomer composition as a heat shrinkable product such as heat shrinkable tube, it is necessary to provide sufficient shrinkable properties thereto. For this purpose, it is essential to cross-link the polymers in the composition prior to expanding.

Such cross-linking can be performed by irradiation of the product obtained from the composition with electron beams in the presence of a cross-linking agent.

Examples of the cross-linking agent which can be used in the present invention include triallyl cyanurate, diacrylates (e.g., diethylene glycol diacrylate, etc.), dimethacrylates (e.g., dipropylene glycol dimethacrylate, etc.), trimethacrylates (e.g., trimethylolpropane trimethacrylate, etc.), diallyl malate, diallyl fumarate, and the like.

Irradiation with electron beams can be carried out in a conventional manner and usually it can be performed at an intensity of 10 Mrads, for example.

After the cross-linking, the product is expanded to form a heat shrinkable product. The present invention limitative examples and comparative examples.

EXAMPLES 1 TO 4

Resin compositions shown in Table 1 below were each mixed for 20 minutes using hot rolls heated at 140° C. and molded into a sheet of 2 mm thick using a hot press heated at 150° C.

Each sheet was irradiated with electron beams of 10 Mrad using a 2 MeV electron accelerator. Then, the sheet sample was subjected to low temperature embrittlement test and the lowest temperatures at which the samples tested did not break were determined. The results obtained with irradiated samples and those obtained with non-irradiated samples (for comparison) are shown in Table 2.

COMPARATIVE EXAMPLE 1 TO 5

Sheet samples were prepared in the same manner as in Examples 1 to 4 except that the polymer blend used in each example was replaced by a tetrafluoroethylenepropylene copolymer alone, a vinylidene fluoridefluoroolefin copolymer alone, or a resin composition consisting of 100 parts by weight of tetrafluoroethylenepropylene copolymer and not smaller than 100 parts by weight of vinylidene fluoride-fluoroolefin copolymer as shown in Table 1. The samples were subjected to low temperature embrittlement test in the same manner as in the examples. The results obtained are shown in Table 2.

EXAMPLES 5 TO 8

Resin compositions shown in Table 1 were each extruded into a tube having an inner diameter of 4 mm and a thickness of 0.5 mm, which was then irradiated with 10 Mrad of electron beams using a 2 MeV electron accelerator. After the tube was heated at 150° C. in an oven, it was expanded using a sizing die for adjusting the outer diameter thereof with applying a pressure from inside so that its inner diameter reached 6 mm, and it was allowed to cool to obtain a heat-shrinkable tube. The thus-obtained heat shrinkable tube was shrinked by allowing it to stand in an incubator at 180° C. for 5 minutes and then was subjected to low temperature embrittlement test to determine the lowest temperature at which the tube did not break.

Further, the above tube was punched to obtain a strip shape test piece. The test piece was subjected to 100% stretching in an oil bath maintained at 150° C. and then cooled with water. Dimensional changes and heat setting properties were examined.

The results obtained are shown in Table 2.

COMPARATIVE EXAMPLE 5 TO 8

Heat shrinkable tubes were prepared in the same manner as in Examples 5 to 8 using the resin compositions shown in Table 1, and subjected to low temperature embrittlement test and heat setting property test in the same manner as in Examples 5 to 8. As a result, it was observed that the tube composed of tetrafluoroethylenepropylene copolymer alone was not heat set and did not serve as a heat-shrinkable tube.

TABLE 1

|  | Fluoroelastomer*1 (wt parts) | VF-FO Copolymer 1*2 (wt parts) | VF-FO Copolymer 2*3 (wt parts) | Crosslinking Agent*4 (wt parts) | Inorganic Filler |
|---|---|---|---|---|---|
| Example |  |  |  |  |  |
| 1 | 100 | 25 | — | 2.5 | 6 |
| 2 | 100 | 45 | — | 3 | 7 |
| 3 | 100 | — | 45 | 3 | 7 |
| 4 | 100 | 70 | — | 3.5 | 8 |
| Comp. Ex. |  |  |  |  |  |
| 1 | 100 | — | — | 2 | 5 |
| 2 | — | 100 | — | 2 | 5 |
| 3 | 100 | 100 | — | 4 | 10 |
| 4 | 100 | — | 100 | 4 | 10 |
| 5 | 100 | 230 | — | 6.5 | 17 |

*1Tetrafluoroethylene-propylene copolymer
*2VF-FO Copolymer 1 is a vinylidene fluoride-fluoroolefin copolymer containing 8 mol % of hexafluoropropylene as the fluoroolefin.
*3VF-FO Copolymer 2 is a vinylidene fluoride-fluoroolefin copolymer containing 7 mol % of tetrafluoroolefin as the fluoroolefin.
*4Triallyl cyanurate

TABLE 2

|  | Low Temperature Characteristics | | | | Volume Resistivity (ohm-cm) | Heat Setting Properties |
|---|---|---|---|---|---|---|
|  | No Irradiation | | Irradiation | | | |
|  | No Breakage (°C.) | Breakage (°C.) | No Breakage (°C.) | Breakage (°C.) | | |
| Example |  |  |  |  |  |  |
| 1 | −5 | −10 | −35 | −40 | $1.2 \times 10^{16}$ | + |

TABLE 2-continued

| | Low Temperature Characteristics | | | | Volume Resistivity (ohm-cm) | Heat Setting Properties |
|---|---|---|---|---|---|---|
| | No Irradiation | | Irradiation | | | |
| | No Breakage (°C.) | Breakage (°C.) | No Breakage (°C.) | Breakage (°C.) | | |
| 2 | 0 | −5 | −10 | −15 | $3.2 \times 10^{15}$ | + |
| 3 | 0 | −5 | −10 | −15 | $2.8 \times 10^{15}$ | + |
| 4 | 0 | −5 | −10 | −15 | $2.3 \times 10^{15}$ | + |
| Comp. Ex. | | | | | | |
| 1 | −75 | — | −70 | −75 | $4.0 \times 10^{16}$ | — |
| 2 | −30 | −35 | −15 | −20 | $6.0 \times 10^{13}$ | + |
| 3 | +5 | 0 | +5 | 0 | $2.0 \times 10^{15}$ | + |
| 4 | +5 | 0 | +5 | 0 | $2.3 \times 10^{15}$ | + |
| 5 | +10 | +5 | +15 | −10 | $1.9 \times 10^{15}$ | + |

Note:
The symbol "+" indicates that when the test piece is subjected to 100% stretching at 150° C. and cooled with water, the stretched form can be held as such at room temperature, whereas the symbol "−" indicates that the stretched form cannot be held.

From the results shown in Table 1 it can be seen that the resin compositions comprising as a resin component a tetrafluoroethylene-propylene copolymer alone, a vinylidene fluoride-fluoroolefin copolymer alone or a blend of a vinylidene fluoride-fluoroolefin copolymer containing not smaller than 100 parts by weight of vinylidene fluoride-fluoroolefin copolymer per 100 parts by weight of tetrafluoroethylene-propylene copolymer, upon irradiation with electron beams, did not show any substantial improvement in or even deteriorated the low temperature characteristics thereof. On the contrary, the compositions of the present invention exhibited substantial improvement in the low temperature characteristics upon irradiation with electron beams and articles composed of the composition could be used at −10° C.

While the invention has been described in detail and with reference to specific embodiments thereof, it will be apparent to one skilled in the art that various changes and modifications can be made therein without departing from the spirit and scope thereof.

What is claimed is:

1. A fluoroelastomer composition consisting of a mixture of a first copolymer, a second copolymer and a cross-linking agent, said first copolymer consisting essentially of monomers of tetrafluoroethylene and propylene and being present in an amount of 100 parts by weight; said second copolymers consisting essentially of monomers of vinylidenefluoride and fluoroolefin and being present in an amount not smaller than 1 part by weight and smaller than 100 parts by weight; said vinylidene fluoride-fluoroolefin copolymer having a fluoroolefin content of 1 to 20 mol%, said flouroolefin in said vinylidene fluoride-fluoroolefin copolymer being selected from the group consisting of hexafluoropropylene and tetrafluoroethylene, said first and said second copolymers essentially not being copolymerized with each other, and said mixture having been cross-linked by irradiation with electron beams the cross-linked mixture having a brittleness temperature of about −10° C. or below.

2. A fluoroelastomer composition as in claim 1, wherein the content of said vinylidene fluoride-fluoroolefin copolymer is not smaller than 10 parts by weight and smaller than 100 parts by weight per 100 parts by weight of said tetrafluoroethylene-propylene copolymer.

3. A fluorelastomer composition as in claim 1, said composition having been further subjected to heating, expanding, and cooling in the expanded state following said cross-linking by irradiation with electron beams.

4. An electrical insulating article as in claim 3, wherein the content of said vinylidene fluoride-fluoroolefin copolymer is not smaller than 10 parts by weight and smaller than 100 parts by weight per 100 parts by weight of said tetrafluoroethylene-propylene copolymer.

5. An electrical insulating article as in claim 4, wherein said article is a heat-shrinkable tube.

6. An electrical insulating article consisting of a mixture of a first copolymer, a second copolymer and a cross-linking agent, said first copolymer consisting essentially of monomers of tetrafluoroethylene and propylene and being present in an amount of 100 parts by weight; said second copolymer consisting essentially of monomers of vinylidene fluoride and fluoroolefin and being present in an amount not smaller than 1 part by weight and smaller than 100 parts by weight; said vinylidene fluoride-fluoroolefin copolymer having a fluoroolefin content of 1 to 20 mol%, said fluoroolefin in said vinylidene fluoride-fluoroolefin copolymer being selected from the group consisting of hexafluoropropylene and tetreafluoroethylene, said first and said second copolymers essentially not being copolymerized with each other, and aid mixture having been cross-linked by irradiation with electron beams the cross-linked mixture having a brittleness temperature of about −10° C. or below.

* * * * *